Jan. 25, 1944. M. R. DAY 2,339,983
DECOY
Filed Aug. 12, 1941
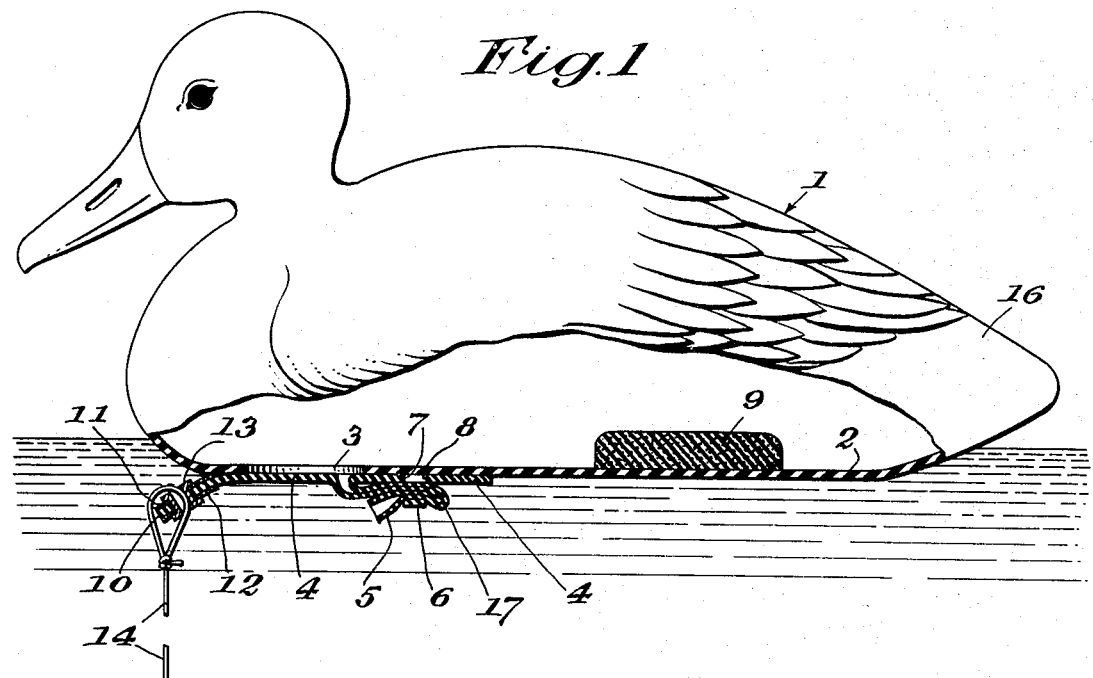
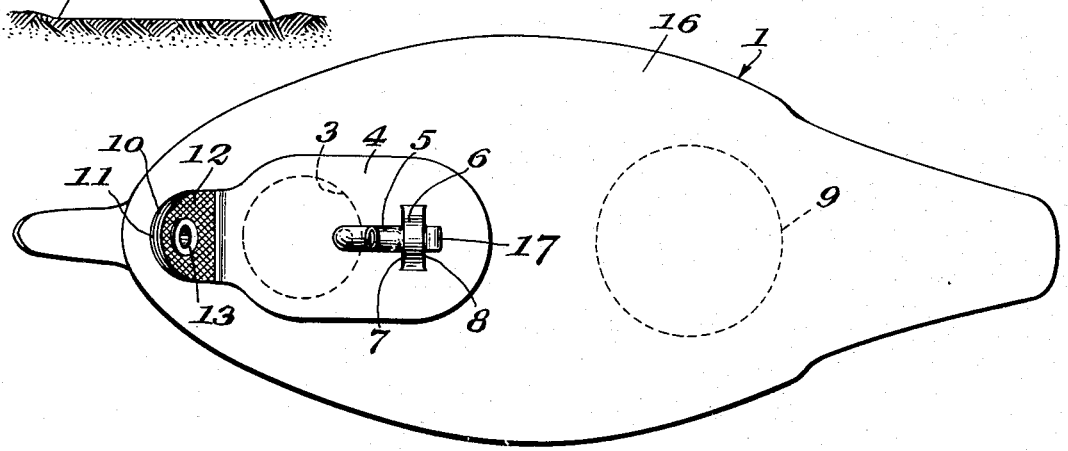
Inventor:
Morgan R. Day
By
Attorney.

Patented Jan. 25, 1944

2,339,983

UNITED STATES PATENT OFFICE 2,339,983

DECOY

Morgan R. Day, North Scituate, Mass., assignor to Dewey and Almy Chemical Company, North Cambridge, Mass., a corporation of Massachusetts Application August 12, 1941, Serial No. 406,490

7 Claims. (Cl. 43—3)

The present invention relates to decoys which are used in hunting wild fowl and is more particularly concerned with decoys of the collapsible or folding type.

The general object of the invention is to provide a decoy which may be quickly and conveniently converted by the hunter from collapsed or folded condition to condition for use without the use of tools or equipment, which will closely resemble the live animal when in use and which is light in weight and capable of being easily reduced to compact size for transportation or storage. Specific objects are to provide in decoys of the collapsible type an improved ballasting arrangement; an improved anchoring means; an improved water-shedding and non-glistening coating; and an improved inflating valve.

In general, the objects of the invention are accomplished by providing a hollow, thin walled body of flexible rubber or similar material shaped to resemble the animal or bird desired and adapted to maintain its form and appearance when inflated to the low pressures which can be provided by the breath of the user. The decoy is so arranged that when it is to be carried or stored away the inflating air may be permitted to escape and the flexible body rolled or folded compactly into small compass.

An illustrative embodiment of the invention is shown in the accompanying drawing in which:

Figure 1 is a side elevation partly broken away, and

Figure 2 is a plan view from below.

In the embodiment selected for illustration, the decoy is formed with a hollow body portion 1 having a continuous flexible wall 2 shaped to the form of a duck. Preferably the body portion is formed of rubber or a material having similar characteristics such as one of the numerous synthetic rubbers. As used hereinafter, the word "rubber" is intended to include such synthetic rubbers as well as the rubbers of nature. I prefer to form the body portion from a rubber dispersion by dipping procedures well known in the rubber manufacturing art. The rubber article obtained in this manner contains the rubber in its natural condition and shows mechanical properties which are superior to those found in rubber obtained from rubber solutions or by milling and sheeting techniques, although it is not intended to exclude such manufacturing procedures.

By the use of a dipping process, the body portion 1 may be formed without seams and complete in one piece except for a relatively small opening 3 in its bottom to permit withdrawal of the mold.

The opening 3 is closed to form an air-tight, hollow body by means of a rubber patch 4 secured to the bottom of the body portion about the opening in any suitable manner, such as by the use of a rubber cement or by moistening the areas to be joined with a rubber solvent and pressing them together. The patch 4 is provided with a hollow tube 5 which serves as an inflating tube through which air may be blown by mouth to inflate the body. The inflating tube may, if desired, be formed as a part of body portion 1, but the manufacturing process is simplified substantially if the tube is formed as a part of the patch 4. Means for closing the inflating tube and securing it in an air-tight manner comprises a strap 6 formed by two parallel slits 7, 8 in patch 4. When the patch 4 is secured to body portion 1 the material lying between these slits is left free and uncemented. When the user has blown the duck up to the desired pressure, the inflating tube may be closed and secured by merely pulling outwardly on strap 6, causing it to stretch and provide an enlarged loop, and then folding the tube 5 upon itself and tucking it through this loop. Upon release of strap 6, the strap will contract, compressing the tube tightly beneath the strap and at the same time buckling or crimping the tube at the point 17 to provide a completely air-tight closure of the body portion of the decoy.

It has been found that decoys having light weight, hollow bodies of the type employed in this invention readily capsize in rough water. This difficulty is overcome in accordance with the present invention by the provision of a ballast weight consisting of a block of milled rubber material 9 secured to the inside surface of the bottom wall of the decoy. The block may be secured to the bottom wall after the body portion has been formed by the use of a rubber solvent or one of the well known rubber cements, but I have found that a secure bond between the two can be formed by simply pressing them together, if this is done while both are in an uncured condition. For best results the material of the block should be loaded with a heavy filling material. It has been found that a relatively large proportion of lead powder or dust may be milled into the rubber to give a loaded material which has a high specific gravity without destroying its capacity to form a secure bond with the body portion.

To provide means for anchoring the decoy, the patch 4 is formed with an extension or tab 10 at its forward end which is left free from attachment to the body portion of the decoy. To the opposite faces of the tab are secured layers of a strong textile material 11, 12 such as cotton duck. These layers are preferably frictioned on to the tabs 10 of patches 4 as one step in their manufacture. The tab is further reenforced by a metal grommet 13 extending through the rubber and textile layers. An anchor line 14 may be passed through the eye of the grommet and secured to a weight 15 of any suitable nature.

The outside surface of the body portion is provided with a coating 16 extending over at least the majority of its surface which is exposed above the water line. This coating is formed of a material which is not only waterproof but is also not readily wetted by water so that any water which may get on to the back of the decoy from waves or rain will be freely shed from the decoy. It has been found that compositions of rubber and a wax are very satisfactory for this purpose. An illustrative preferred mixture has the following composition:

| | |
|---|---|
| Rubber latex (solids) | 100 |
| Paraffin wax (aqueous emulsion, 60% wax) | 24 |
| Titanium dioxide | 1 |
| Sulphur | .75 |
| Accelerator | 1 |

Dyes or pigments may be added to give the colors desired.

Suitable coating compositions may be made from solutions of chlorinated or hydrochlorinated rubber, synthetic rubbers or synthetic resins such as vinyl acetate or the conjoint polymer of vinyl chloride and vinyl acetate in appropriate solvents containing a water-repellent material. As the water-repellent material, materials such as stearic acid, zinc stearate, or other metal stearates, metal laurates and other materials of a waxy nature may be used. A small amount of cotton flock may be added to these compositions if desired.

The coating may be applied to the body of the decoy by spraying it from an air gun.

To increase further the resemblance of the decoy to a live animal or bird as seen from the air, I provide the coating 16 with a matte or dull surface. This finish is obtained by dipping the coated body portion for a few seconds in a rubber solvent such as toluol or carbon tetrachloride. This has the effect of producing minute pits or irregularities in the surface giving it an exceedingly fine grained roughness. This surface finish is most effective in diffusing light reflected from the decoys so that they present a natural and non-glistening appearance in sunlight, even when in use in rough water or in the rain.

It has been found most effective to inflate the decoys only sufficiently to hold the head up. In this condition the body and head are soft and flabby and the decoy presents a most lifelike appearance.

Decoys made in accordance with the present invention present a remarkably lifelike appearance. Their general make-up causes them to appeal to children as toys and it is accordingly not intended to exclude, by use of the word "decoy," uses for the articles other than as decoys.

By following the teachings of the above disclosure, a decoy is provided which may be quickly and easily deflated and rolled or folded into a small compass for carrying or storage, and may be inflated and placed in condition for use by the hunter in a few minutes without the use of tools or special equipment. When in use the decoys present an appearance suggestive of live animals and are efficient and effective for the purpose intended.

I claim:

1. A collapsible decoy comprising a hollow body having a flexible wall of rubber, the external surface of the wall being roughened by treatment with a rubber solvent whereby the decoy presents a non-glistening appearance in sunlight.

2. A collapsible decoy comprising a hollow body having a flexible bottom wall, a flexible inflating tube extending from the bottom wall and an elastic loop on the bottom wall adjacent the tube whereby the tube may be folded upon itself and tucked under the loop to prevent escape of air from the body.

3. A collapsible decoy comprising a hollow body portion having an opening in its bottom wall, a closure member for the opening containing an inflating valve and secured to the body portion about the opening with the valve in registry with the opening, a portion of the closure being left free from attachment to form a tab by which the decoy may be secured.

4. A collapsible decoy comprising a hollow body portion having a flexible wall of rubber, a stabilizing weight located inside the body portion and comprising a mass of milled rubber containing particles of heavy material, the weight being secured to the lower inside surface of the wall.

5. A collapsible decoy comprising a hollow body provided on its outer surface with a water-shedding coating of a mixture of rubber and a wax, the surface of the coating being roughened by treatment with a rubber solvent whereby the decoy presents a non-glistening appearance in sunlight.

6. A collapsible decoy comprising a hollow body provided with a water-shedding coating of a mixture of a wax and rubber and a stabilizing weight located entirely within the body portion and secured to the inside surface of the bottom wall thereof.

7. A collapsible decoy comprising a hollow, flexible body portion, a stabilizing weight located entirely within the body portion and secured to the inside surface of the bottom wall thereof, the outside surface of the body portion having a matte finish whereby the decoy presents a non-glistening appearance in sunlight.

MORGAN R. DAY.